US011077781B2

(12) United States Patent
Beuschel et al.

(10) Patent No.: US 11,077,781 B2
(45) Date of Patent: Aug. 3, 2021

(54) PNEUMATIC VALVE

(71) Applicant: Conti Temic microelectronic GmbH, Nuremberg (DE)

(72) Inventors: Michael Beuschel, Nuremberg (DE); Johann Steinberger, Nuremberg (DE); Norbert Seltner, Nuremberg (DE); Stefan Bauer, Nuremberg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 85 days.

(21) Appl. No.: 16/588,407

(22) Filed: Sep. 30, 2019

(65) Prior Publication Data
US 2020/0101883 A1    Apr. 2, 2020

(30) Foreign Application Priority Data
Oct. 1, 2018   (DE) ...................... 10 2018 216 874.1

(51) Int. Cl.
*B60N 2/90* (2018.01)
*F16K 31/122* (2006.01)
(Continued)

(52) U.S. Cl.
CPC ............ *B60N 2/914* (2018.02); *B60N 2/643* (2013.01); *F16K 31/1223* (2013.01); *F16K 31/1225* (2013.01); *F03G 7/065* (2013.01)

(58) Field of Classification Search
CPC ..... B60N 2/914; B60N 2/643; F16K 31/1223; F16K 31/1225; F16K 31/1221; F03G 7/065
(Continued)

(56) References Cited

U.S. PATENT DOCUMENTS

| 3,613,732 | A |   | 10/1971 | Willson et al. |
| 4,491,364 | A | * | 1/1985  | Hattori ................ B60N 2/66 297/284.6 |

(Continued)

FOREIGN PATENT DOCUMENTS

| CN | 1530580   A |  9/2004 |
| CN | 102803803 A | 11/2012 |

(Continued)

OTHER PUBLICATIONS

Office Action dated May 7, 2021 from corresponding Chinese Patent Application No. 201910859709.X.

*Primary Examiner* — Mark R Wendell (57) ABSTRACT

A fluid bladder valve for a pneumatic vehicle seat adjustment device is disclosed. The valve comprises a first chamber configured to connect to a fluid source, a second chamber configured to connect to the fluid bladder, a third chamber configured to connect to an environment, a fourth chamber connected to the first chamber via a first fluid passage, connected to the second valve chamber via a second fluid passage, and connected to the third valve chamber via a third fluid passage; and an actuator comprising a blocking element disposed in the fourth chamber and an actuator element disposed in the third valve chamber and coupled to the blocking element and configured to move the blocking element between a first position wherein the first passage is opened and the third passage is closed, and a second position wherein the first passage is closed and the third passage is opened.

15 Claims, 7 Drawing Sheets

(51) Int. Cl.
*B60N 2/64* (2006.01)
*F03G 7/06* (2006.01)

(58) Field of Classification Search
USPC ..................................................... 297/284.1
See application file for complete search history.

(56) References Cited

U.S. PATENT DOCUMENTS

| | | | |
|---|---|---|---|
| 5,040,567 A * | 8/1991 | Nestler | ............... F16K 31/0682 |
| | | | 137/625.44 |
| 7,748,405 B2 | 7/2010 | Ghorbal et al. | |
| 2005/0121636 A1 * | 6/2005 | Scott | ..................... F16K 31/025 |
| | | | 251/129.06 |
| 2007/0023089 A1 | 2/2007 | Beyerlein et al. | |
| 2012/0160334 A1 * | 6/2012 | Deperraz | .............. F16K 31/025 |
| | | | 137/13 |
| 2014/0125042 A1 | 5/2014 | Koepfer et al. | |
| 2016/0362023 A1 | 12/2016 | Dankbaar | |
| 2018/0038514 A1 | 2/2018 | Kuszneruk et al. | |

FOREIGN PATENT DOCUMENTS

| | | |
|---|---|---|
| DE | 102005060217 A1 | 7/2006 |
| DE | 102012212686 A1 | 1/2014 |
| DE | 102013220557 A1 | 4/2015 |
| DE | 102015219182 A1 | 4/2017 |
| DE | 102015219195 A1 | 4/2017 |
| DE | 102016219342 A1 | 4/2018 |
| DE | 102017204662 B3 | 7/2018 |
| EP | 2239486 A1 | 10/2010 |
| WO | 2012082951 A2 | 6/2012 |
| WO | 2014135909 A1 | 9/2014 |
| WO | 2015185132 A1 | 12/2015 |

* cited by examiner

PNEUMATIC VALVE

BRIEF DESCRIPTION OF THE DRAWINGS

Exemplary embodiments are explained in more detail hereunder with reference to the appended drawings. In the drawings:

FIG. 1 shows a schematic view of an exemplary pneumatic valve according to the disclosure which in an exemplary manner is used in an adjustment device for adjusting a contour of a seat bearing surface of a vehicle seat, wherein FIG. 1 shows a blocking element of the pneumatic valve in a first position;

FIG. 2 shows a schematic view of an exemplary pneumatic valve according to the disclosure, wherein FIG. 2 shows the blocking element in a second position;

FIG. 5 shows a schematic view of a further exemplary valve assembly according to the disclosure, wherein FIG. 5 shows the valve assembly in a first switched position;

FIG. 6 shows a schematic view of the exemplary valve assembly of FIG. 5, wherein FIG. 6 shows the valve assembly in a second switched position; and FIG. 7 shows a schematic view of the exemplary valve assembly of FIG. 5, wherein FIG. 7 shows the valve assembly in a third switched position;

DETAILED DESCRIPTION

The present disclosure relates to a pneumatic valve, and, in particular for a fluid bladder of a pneumatic adjustment device of a vehicle seat. The present disclosure furthermore relates to a valve assembly comprising a valve of this type, as well as to an adjustment device comprising a valve of this type.

Pneumatic valves are used for controlling fluid flows in a multitude of technical fields of application. Pneumatic valves of this type are to be found, for example, in a pneumatic adjustment device for adjusting a seat surface or seat rest, respectively, (collectively referred to as a seat bearing surface) of a vehicle seat. The adjustment device in a region of the seat bearing surface usually comprises one or a plurality of fluid chambers or fluid bladders, respectively, which can be filled with a fluid, in particular with compressed air. By filling a respective fluid bladder with fluid the volume of said fluid bladder is enlarged, on account of which the properties of the seat bearing surface can be modified and thus a contour of the seat bearing surface can be adapted. In order for the fluid bladders to be filled with fluid, the fluid is first generated by a fluid source such as a fluid compressor and subsequently routed via one or a plurality of pneumatic valves to a respective fluid bladder.

It is known herein for so-called valve actuators to be used for activating such valves. Said valve actuators are configured for activating a blocking element of the valve such that a fluid connector of the valve can be opened and/or closed.

In the case of a first group of known pneumatic valves, valve actuators of this type are disposed in the valve in such a manner that there is a complete fluidic separation between the fluid and the valve actuator. This complete separation can be achieved, for example, by a fluid-tight elastic membrane between the blocking element and the valve actuator. However, the additionally required actuating force of the valve actuator herein is disadvantageous since not only the blocking element has to be moved but also the elastic membrane.

In the case of a second group of known pneumatic valves, the valve actuator is disposed within the valve space that is passed through by the flow of fluid, in particular within the valve space that is connected to the fluid source. In the case of this group of pneumatic valves, no additional actuating force of the valve actuator is indeed required. However, it is disadvantageous that the valve actuators have to be fluidically sealed in relation to the environment. This leads to additional costs and to an increased complexity in terms of the construction of the valve.

It is therefore an object of the present disclosure to provide a cost-effective pneumatic valve in which the valve actuator has to handle comparatively minor actuating forces and additional sealing elements in the region of the valve actuator can at the same time be dispensed with.

Said object is achieved by the subject matter of the independent claims. Advantageous configurations are the subject matter of the dependent claims.

According to a first aspect, a pneumatic valve for a fluid bladder of a pneumatic adjustment device of a vehicle seat is provided. The pneumatic valve comprises a first valve chamber which is connectable to a fluid source, a separate second valve chamber which is separate from the first valve chamber and is connectable to the fluid bladder, and a separate third valve chamber which is separate from the first valve chamber and the second valve chamber and is connectable or connected to an environment of the pneumatic valve. The term "environment" herein refers to that region of the pneumatic valve that is disposed outside the valve and is at ambient pressure. In other words, the environment of the valve is the atmosphere surrounding the valve, and in particular is not the fluid bladder or the fluid source. Besides the first, the second, and the third valve chamber, the pneumatic valve according to the disclosure furthermore comprises a separate fourth valve chamber which is separate from the first valve chamber, the second valve chamber, and the third valve chamber. The fourth valve chamber herein is fluidically connected only via a first fluid passage to the first valve chamber, only via a second fluid passage to the second valve chamber, and only via a third fluid passage to the third valve chamber.

The pneumatic valve according to the disclosure furthermore comprises an actuator unit which comprises a blocking element disposed in the fourth valve chamber and an actuator element which is disposed in the third valve chamber and is coupled to the blocking element and is configured for moving the blocking element between a first position in which the first fluid passage is opened and the third fluid passage is closed, and a second position in which the first fluid passage is closed and the third fluid passage is opened. In other words, the second fluid passage is at all times opened, in both the first position as well as in the second position of the blocking element.

On account thereof, fluid in the first position of the blocking element can flow exclusively from the first valve chamber (via the fourth valve chamber) into the second valve chamber while the third fluid passage is closed by the blocking element such that there is no fluidic connection between the first valve chamber and the third valve chamber. It is prevented on account of this arrangement that fluid in the first position of the blocking element can flow from the fluid source to the third valve chamber. However, since the actuator element is disposed in the third valve chamber it is not necessary for the actuator element to be disposed in a fluid-tight manner in the third valve chamber. On account thereof, components which serve for sealing the actuator element can be saved, on account of which the complexity in terms of construction of the valve and the production costs can be reduced.

At the same time, the first fluid passage is closed and the third fluid passage is opened in the second position of the blocking element. The fluid in the second position of the blocking element can therefore flow exclusively from the second fluid chamber into the third fluid chamber while a fluidic connection between the second valve chamber and the first valve chamber is blocked. Since the fluid bladder is ventilated or emptied, respectively, in the second position of the blocking element, that is to say that the fluid is to be fed to the environment anyway, it is again not necessary for the actuator element to be disposed in a fluid-tight manner in the third valve chamber.

Furthermore, since the actuator element is disposed in the third valve chamber and the blocking element is disposed in the fourth valve chamber, and the blocking element in the first position as well as in the second position prevents any fluidic connection between the first valve chamber and the third valve chamber, it is not necessary for an elastic membrane or the like to be provided between the actuator element and the blocking element. An unnecessary increase in the actuating forces of the actuator element is prevented on account thereof. The pneumatic valve according to the disclosure thus represents a cost-effective pneumatic valve which is simple in terms of construction and in which neither the actuating force of the actuator element is unnecessarily increased nor complex sealing elements are required in the region of the actuator element.

According to one design embodiment of the pneumatic valve, the actuator element is a shape memory alloy element (SMA element) which, for example, is composed of a binary or ternary NiTi-based alloy and when impinged with electric energy is configured for activating the blocking element. In this design embodiment, the actuator element is configured as a shape memory alloy element which is heated by impingement with electric energy, in particular electric current, and the energy input associated therewith, on account of which the shape memory alloy element is deformed, in particular modifies the length thereof, and after subsequent cooling reassumes the original shape thereof. The pneumatic valve can be further simplified on account of this design embodiment since the shape memory alloy element, as opposed to other actuator elements such as, for example, a piezoelectric or magnetic actuator element, is of a significantly simpler construction. For example, the shape memory alloy element is electrically connected to a circuit board which is configured for impinging the shape memory alloy element with electric energy. However, since the shape memory alloy element is disposed in the third valve chamber and no particular precautions pertaining to fluid tightness are required, the circuit board can readily be inserted in an opening of the third valve chamber, for example, wherein a fluidic connection between the third valve chamber and the environment of the valve can continue to exist even in the case of an inserted circuit board. No additional requirements pertaining to the fluid-tight fastening of the circuit board thus have to be set in this design embodiment, on account of which costs for contacting the circuit board can also be saved.

According to one further design embodiment of the pneumatic valve, the actuator unit comprises a coupling element which extends through the third fluid duct and couples the blocking element to the actuator element. This design embodiment is particularly simple in terms of construction and is therefore cost-effective.

According to one preferred design embodiment, the pneumatic valve comprises a sound absorption element which is disposed in the third valve chamber and is configured for damping flow noises and/or switching noises of the valve. Any generation of noise, in particular when switching the blocking element, can be effectively damped in this design embodiment. A sound absorption element of this type can be a foam or a felt, for example.

According to one preferred design embodiment, the sound absorption element defines a passage or opening, respectively, through which the coupling element extends. A particularly effective damping of noise can be provided in that the coupling element extends through the passage of the sound absorption element.

According to one further design embodiment, the actuator unit furthermore comprises a lever element which is disposed in the third valve chamber and via a linking region is connected to a housing of the pneumatic valve and/or a wall of the third valve chamber. A first fastening portion of the lever element herein is connected to the actuator element and a second fastening portion of the lever element is connected to the coupling element such that when activating the actuator element a movement of the lever element is converted to a movement of the coupling element.

In one particularly preferred design embodiment, the actuator element is fastened to the first fastening portion in such a manner that a first lever arm is formed between the first fastening portion and the linking region, and the coupling element is fastened to the second fastening portion in such a manner that a second lever arm which is larger than the first lever arm is formed between the second fastening portion and the linking region. In that the second lever arm is larger than the first lever arm, a stroke of the actuator element, or a positional modification of the shape memory alloy element, respectively, can be converted to a larger stroke of the coupling element and thus to a larger stroke of the blocking element.

According to one further design embodiment, the actuator unit furthermore comprises a restoring element which is connected to the housing and to the lever arm and without activating the actuator element is configured for pretensioning the blocking element to the first position or to the second position. On account thereof, a NO valve (normally open valve) or a NC valve (normally closed valve) can be achieved in a simple manner.

According to one further design embodiment, the first fluid passage is disposed on a first side of the fourth valve chamber, and the third fluid passage is disposed on a second side, opposite the first side, of the fourth valve chamber, wherein the blocking element is movable between the first side and the second side. On account of this design embodiment, switching between the first position and the second position can be effected by a simple movement of the blocking element between two mutually opposite sides.

According to one preferred design embodiment, the first fluid passage extends along a first axis and the third fluid passage extends along a second axis, wherein the first axis and the second axis are mutually coaxial. In this design embodiment, the first fluid passage and the third fluid passage are disposed so as to be mutually aligned such that the linear movement of the blocking element between the mutually opposite sides leads to particularly simple opening and closing of the first fluid passage or the third fluid passage, respectively. In one particularly preferred design embodiment the coupling element is moreover disposed so as to be coaxial with the first and the second axis such that a force of the coupling element acts centrically on the blocking element, this leading to uniform sealing along a circumference of the first or of the third fluid passage, respectively.

According to one preferred design embodiment, the second fluid passage is disposed on the first side of the fourth valve chamber, that is to say on the same side as the first fluid passage, and has a predetermined spacing from the first fluid passage. The fourth valve chamber can be implemented with merely a few components on account of this design embodiment.

In one particularly preferred design embodiment, the fourth valve chamber can be produced as a two-part component or housing, wherein a first component comprises the first fluid passage and the second fluid passage, and a second component which is connected to the first component comprises the third fluid passage. The first component can have a pot-shaped design, for example, and the second component can be placed from above onto the pot-shaped first component.

According to a second aspect, a valve assembly for two separate fluid bladders (that is to say for a first and a second fluid bladder) of an adjustment device of a vehicle seat is provided. The valve assembly comprises a first pneumatic valve according to the first aspect, or designs embodiments of said first aspect, respectively, wherein the first pneumatic valve is configured for filling and/or emptying the first fluid bladder. The valve assembly furthermore comprises a second pneumatic valve according to the first aspect, or designs embodiments of said first aspect, respectively, wherein the second pneumatic valve is configured for filling and/or emptying the second fluid bladder. Furthermore, the first valve chamber of the first pneumatic valve is fluidically connected to the first valve chamber of the second pneumatic valve; the first valve chamber of the first pneumatic valve and/or the first valve chamber of the second pneumatic valve are conjointly or in each case fluidically connectable to the fluid source; the second valve chamber of the first pneumatic valve is connectable to the first fluid bladder; the second valve chamber of the second pneumatic valve is connectable to the second fluid bladder; and the third valve chamber of the first pneumatic valve and the third valve chamber of the second pneumatic valve are conjointly or in each case connectable or connected, respectively, to the environment. The valve assembly according to the disclosure enables two separate fluid bladders to be filled and/or emptied in a mutually separate manner.

In other embodiments, the first valve chamber can of course be connected to the fluid bladder instead of the fluid source, or the second valve chamber can be connected to the fluid source instead of the fluid bladder, respectively, depending on the specific application.

According to a third aspect, a valve assembly for a (single) fluid bladder of an adjustment device of a vehicle seat is provided, said valve assembly comprising a first pneumatic valve according to the first aspect, or design embodiments of said first aspect, respectively, as well as a second pneumatic valve according to the first aspect, or design embodiments of said first aspect, respectively. However, the second valve chamber of the first pneumatic valve here is fluidically connected to the second valve chamber of the second pneumatic valve. Furthermore, the first valve chamber of the first pneumatic valve is connectable to the fluid source, and the first valve chamber of the second pneumatic valve is connectable to the fluid bladder. Moreover, the third valve chamber of the first pneumatic valve and the third valve chamber of the second pneumatic valve are conjointly or in each case connectable or connected, respectively, to the environment. In this valve assembly, the first valve chamber of the second pneumatic valve is thus not connectable to the fluid source but to the fluid bladder. On account of this conjoint switching, a valve assembly via which a fluid bladder can not only be filled and/or emptied but the pressure in the interior of the fluid bladder can also be maintained can be achieved in a simple manner. This is particularly advantageous for a static contour adjustment of a seat bearing surface of the vehicle seat.

Of course, arbitrary other valve assemblies can be achieved by a corresponding other conjoint switching of two or a plurality of pneumatic valves according to the disclosure, depending on the specific application.

According to a fourth aspect, an adjustment device for adjusting a contour of a seat bearing surface of a vehicle seat is finally provided. The adjustment device comprises a fluid bladder for adjusting the contour of the seat bearing surface, and a pneumatic valve according to the first aspect, or design embodiments of said first aspect, respectively, wherein the second valve chamber of the pneumatic valve is fluidically connected to the fluid bladder.

Embodiments will be described hereunder by means of a pneumatic valve which is used for filling and/or emptying a fluid bladder of a pneumatic adjustment device of a vehicle seat. Of course, the pneumatic valve can be used in various valve assemblies, depending on the specific application, and also be utilized for other purposes.

Figure 1:
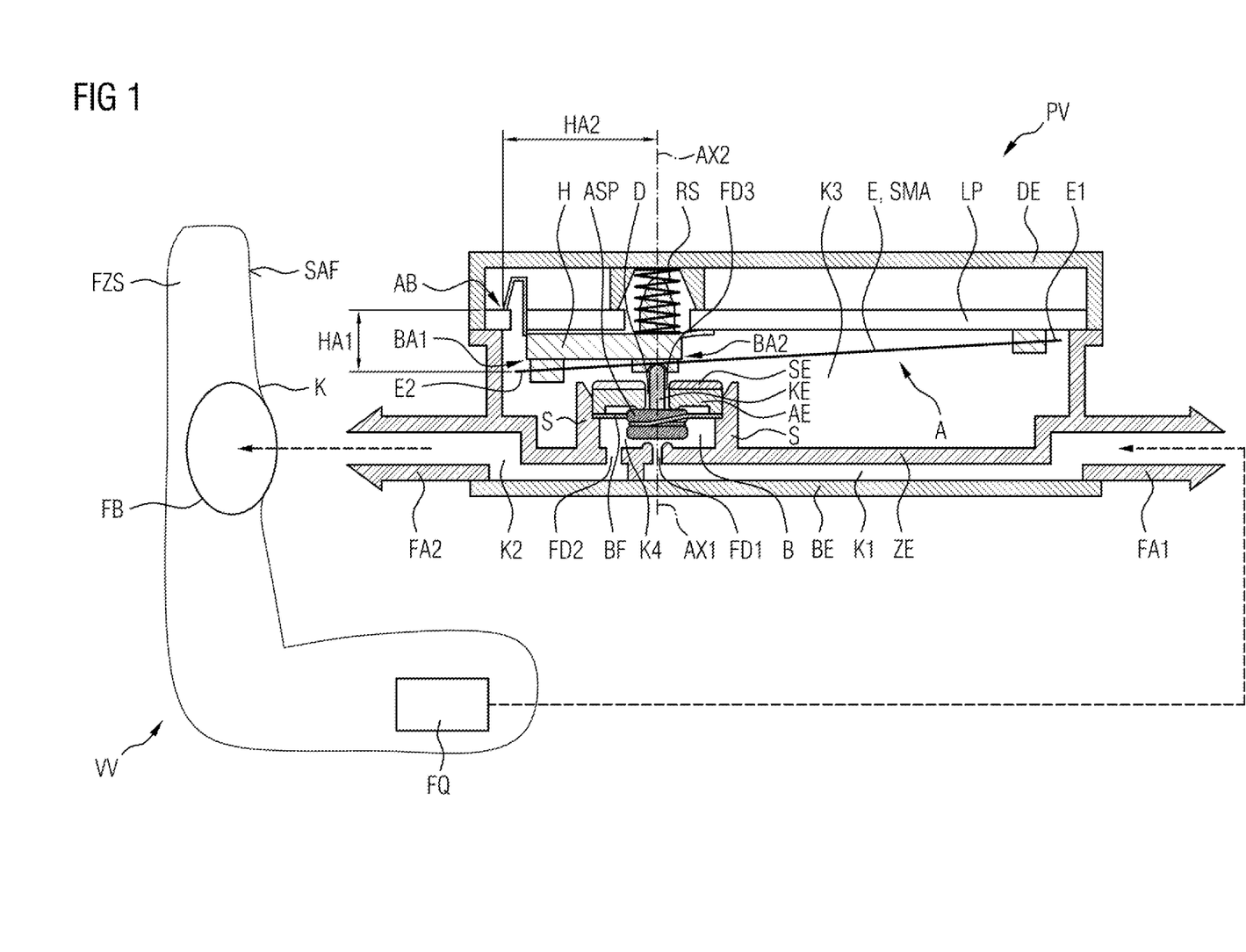

Reference is first to be made to FIG. 1 which shows a schematic view of a pneumatic valve PV. The pneumatic valve PV in FIG. 1 is shown as part of an adjustment device VV for adjusting a contour K of a seat bearing surface SAF of a vehicle seat FZS. The adjustment device VV comprises a fluid bladder FB, in particular an elastic fluid bladder FB, which can be filled with a pressurized fluid which is provided by a fluid source FQ. The volume of the fluid bladder FB is enlarged by filling the latter, on account of which the contour K of the seat bearing surface SAF can be modified. The volume of the fluid bladder FB is reduced by emptying the later, such that the fluid bladder FB reassumes the original shape thereof.

The pneumatic valve PV comprises a first valve chamber K1 which is connected to the fluid source FQ. The pneumatic valve PV comprises a second valve chamber K2 which is separate from the first valve chamber K1 and is connected to the fluid bladder FB. The first valve chamber K1 and the second valve chamber K2 in the specific example of FIG. 1 are formed by a basic element BE and a base element ZE which is connected to the basic element BE. As can be readily seen in FIG. 1, the basic element BE and the base element ZE form two valve chambers which are fluidically separated from one another, one of said valve chambers representing the first valve chamber K1 and the other representing the second valve chamber K2. The first valve chamber K1 herein comprises a first fluid connector FA1 which serves for fluidically connecting to the fluid source FQ. The second valve chamber K2 comprises a second fluid connector FA2 which serves for fluidically connecting to the fluid bladder FB. Of course, other components may also be connected to the fluid connectors FA1, FA2.

The pneumatic valve PV furthermore comprises a third valve chamber K3 which is separate from the first valve chamber K1 and the second valve chamber K2. The third valve chamber K3 in the specific example of FIG. 1 is formed by the base element ZE and a cover element DE which is connected to the base element ZE. The third valve chamber K3 is connected to the environment of the pneumatic valve PV such that the ambient pressure substantially prevails in the interior of the third valve chamber K3.

The pneumatic valve PV furthermore comprises a fourth valve chamber K4 which is separate from the first valve chamber K1, the second valve chamber K2, and the third valve chamber K3. The fourth valve chamber K4 is composed of substantially two components.

The first component represents the base element ZE which in the region of the fourth valve chamber K4 comprises a pot-shaped design comprising two upwardly extending webs S. Said webs S enclose a region B which is open toward the top. The second component of the fourth valve chamber K4 represents a cover element AE which is placed from above onto the webs S and delimits the region B from above. In other words, the fourth valve chamber K4 is formed by a two-part housing, the first component of said housing in the specific example of FIG. 1 being the base element ZE and the second component of said housing being the cover element AE.

As can furthermore be seen in FIG. 1, the fourth valve chamber K4 is fluidically connected to the first valve chamber K1 via a first fluid passage FD1, and the fourth valve chamber K4 is fluidically connected to the second valve chamber K2 via a second fluid passage FD2. In the specific example of FIG. 1, the first fluid passage FD1 and the second fluid passage FD2 are configured as openings in the base element ZE, wherein the second fluid passage FD2 has a predetermined spacing from the first fluid passage FD1.

As can furthermore be seen in FIG. 1, the fourth valve chamber K4 is fluidically connected to the third valve chamber K3 via a third fluid passage FD3. The third fluid passage FD3 in the specific example of FIG. 1 is configured as an opening in the cover element AE. In other words, the first fluid passage FD1 and the second fluid passage FD2 are configured on a first side of the fourth valve chamber K4, specifically on the side of the base element ZE, and the third fluid passage FD3 is configured on a second side, opposite the first side, of the fourth valve chamber K4, specifically on the side of the cover element AE.

As can furthermore be seen in FIG. 1, the first fluid passage FD1 extends along a first axis AX1, and the third fluid passage FD3 extends along a second axis AX2, wherein the second axis AX2 and the first axis AX1 are mutually coaxial, or form a common axis, respectively.

The pneumatic valve PV furthermore comprises an actuator unit A. The actuator unit A comprises an actuator element E disposed in the third valve chamber K3 and a blocking element ASP which is disposed in the fourth valve chamber K4 and is mechanically coupled to the actuator element E and when impinged with electric energy can activate the blocking element ASP such that the blocking element ASP can be moved substantially between a first position and a second position, as will be described later in more detail in the context of FIGS. 1 and 2. The actuator element E herein can be any arbitrary actuator element E, for example a piezoelectric or magnetic actuator element.

The actuator element E in the specific example of FIG. 1 is a shape memory alloy element SMA, for example in the form of a wire. Shape memory alloy elements are imparted a shape modification by being impinged with electric energy, said shape modification being able to be utilized for activating the blocking element ASP. To this end, the shape memory alloy element SMA is electrically connected to a circuit board LP which is likewise disposed in the third valve chamber K3.

Besides the actuator element E and the blocking element ASP, the actuator unit A comprises a coupling element KE. The coupling element KE extends through the third fluid passage FD3 and couples the actuator element E to the blocking element ASP such that by impinging the actuator element E with electric energy the actuator element E can activate the blocking element ASP and move the latter between the first position and the second position.

The actuator unit A furthermore comprises a lever element H which is connected to the actuator element E and the coupling element KE. The lever element H at a linking region AB is connected to the cover element DE and can rotate about the linking region AB.

The actuator element E at a first fastening portion BA1 of the lever element H is connected to the lever element H, and the coupling element KE at a second fastening portion BA2 of the lever element H is connected to the lever element H. The first fastening portion BA1 in relation to the linking region AB is chosen such that a first lever arm HA1 is formed between the first fastening portion BA1 and the linking region AB. The second fastening portion BA2 in relation to the linking region AB is chosen such that a second lever arm HA2 which is larger than the first lever arm HA1 is formed between the second fastening portion BA2 and the linking region AB. On account of this design embodiment, a stroke of the actuator element E can be converted to an enlarged stroke of the coupling element KE and thus to an enlarged stroke of the blocking element ASP.

The mentioned two positions of the blocking element ASP are now to be discussed in more detail hereunder.

Reference is first to be made to FIG. 1 which shows the blocking element ASP in the first position.

As has already been mentioned, the actuator element E in the specific example of FIG. 1 is configured as a shape memory alloy element SMA. A first end E1 of the shape memory alloy element SMA herein is electrically connected to the circuit board LP. At the first fastening portion BA1, a second end E2, opposite the first end E1, of the shape memory alloy element SMA is connected to the lever element H.

The linking region AB herein is designed such that said linking region is mechanically connected to a wall of the third valve chamber K3, or a housing of the pneumatic valve PV, respectively, as well as electrically connected to the circuit board LP.

When the shape memory alloy element SMA now is impinged with electric energy, the shape memory alloy element SMA is heated. On account thereof, the shape memory alloy element SMA is shortened such that the lever element H rotates about the linking region AB. On account of the rotation of the lever element H, the first as well as the second fastening portion BA1, BA2 are rotated about the linking region AB. Since the second lever arm HA2 is larger than the first lever arm HA1, the second fastening portion BA2 is rotated to a greater extent than the first fastening portion BA1. The coupling element KE which in turn at the second fastening portion BA2 is connected to the lever element H and couples the blocking element ASP to the shape memory alloy element SMA, when the shape memory alloy element SMA is impinged with electric energy accordingly moves in the direction toward the cover element AE until the blocking element ASP finally physically contacts the cover element AE and closes the third fluid passage FD3.

The first fluid passage FD1, or the first axis AX1 thereof, respectively, the third fluid passage FD3, or the second axis AX2 thereof, respectively, the cover element AE and the base element ZE herein are configured in such a manner that the blocking element ASP in the first position releases the first fluid passage FD1 as well as closes the third fluid passage FD3. At the same time, the second fluid passage FD2 remains opened. In the first position of the blocking element ASP, a fluidic connection is thus established between the first valve chamber K1 and the fourth valve chamber K4 (via the first fluid passage FD1) and between the fourth valve chamber K4 and the second valve chamber K2 (via the second fluid passage FD2), without there being a fluidic connection between the first valve chamber K1 and the third valve chamber K3. The pressurized fluid can therefore only flow from the fluid source FQ into the first valve chamber K1 and from there via the second valve chamber K2 into the fluid bladder FB.

However, since the third fluid passage FD3 is closed in the first position of the blocking element ASP, the pressurized fluid cannot flow into the third valve chamber K3. However, since the actuator element E, or the shape memory alloy element SMA, respectively as well as the circuit board thereof are disposed in the third valve chamber K3, it is not necessary for the actuator element E, or the circuit board LP thereof, respectively, to be disposed in a fluid-tight manner in the third valve chamber K3. This reduces the complexity in terms of construction of the pneumatic valve PV and saves costs when electrically linking the shape memory alloy element SMA.

Figure 2:
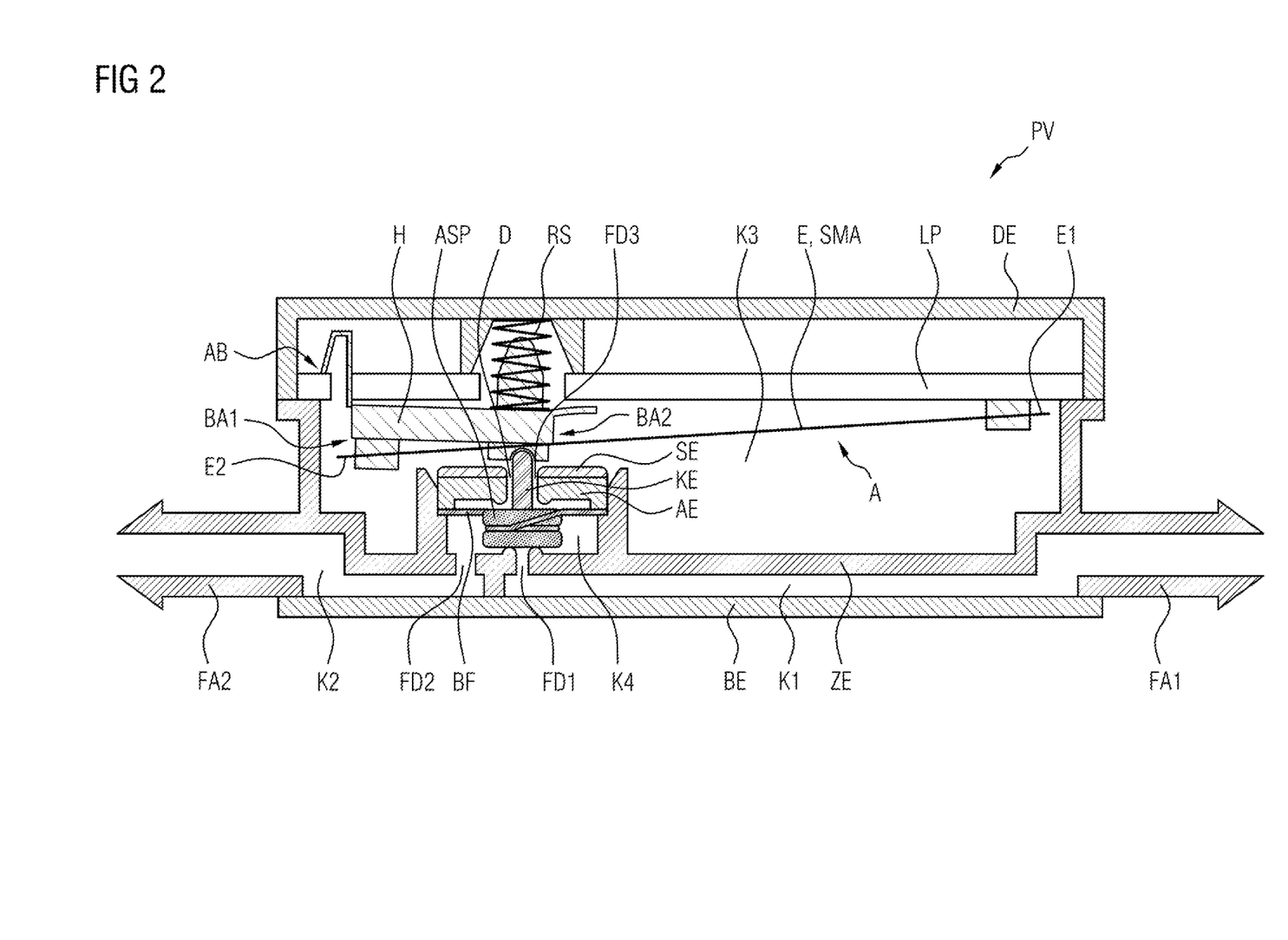

Reference is now to be made to FIG. 2 which shows the blocking element ASP in the second position. For improved clarity, the vehicle seat FZS, the fluid bladder FB, and the fluid source FQ are not shown in FIG. 2.

As has already been mentioned, the actuator unit A comprises an actuator element E which in the specific case is configured as a shape memory alloy element SMA, as well as a blocking element ASP, a coupling element KE, and a lever element H.

In order to now be able to move the blocking element ASP, proceeding from the first position, to the second position, the actuator unit A furthermore comprises a restoring element RS which is connected to the housing of the pneumatic valve PV and to the lever element H, or the second fastening portion BA2, thereof, respectively. The restoring element RS exerts a restoring force on the lever element H such that the lever element H is pretensioned in the direction toward the base element ZE.

When the impingement of the actuator element E, or of the shape memory alloy element SMA, respectively, with electric energy is now terminated, the shape memory alloy element SMA reassumes the original shape or length thereof, respectively. The restoring element RS now moves the lever element H in the direction toward the base element ZE such that the lever element H (via the coupling element KE) moves the blocking element ASP to the base element ZE until the blocking element ASP physically contacts the base element ZE.

The blocking element ASP in this second position now releases the third fluid passage FD3 and at the same time closes the first fluid passage FD1. At the same time, the second fluid passage FD2 again remains opened. In the second position of the blocking element ASP, a fluidic connection is thus established between the second valve chamber K2 and the fourth valve chamber K4 (via the second fluid passage FD2) and between the fourth valve chamber K4 and the third valve chamber K3 (via the third fluid passage FD3), without there being a fluidic connection between the first valve chamber K1 and the third valve chamber K3. The pressurized fluid can therefore not flow from the fluid source FQ into the third valve chamber K3.

Nevertheless, the fluid situated in the fluid bladder FB can flow into the third valve chamber K3 and be routed from there into the environment such that the fluid bladder FB can be emptied.

Since the third fluid passage FD3 in the second position of the blocking element ASP is opened and at the same time the first fluid passage FD1 is closed, only the fluid present in the fluid bladder FB can flow into the third valve chamber K3. Since the fluid of the fluid bladder FB is to be fed to the environment anyway, it is in turn not necessary for the actuator element E, or the shape memory alloy element SMA, respectively, and the circuit board LP thereof to be disposed in a fluid-tight manner in the third valve chamber K3. On account thereof, a cost-effective pneumatic valve PV which is simple in terms of construction and in which complex seals in the region of the actuator element E can be dispensed with is achieved.

Since the first axis AX1 of the first fluid passage FD1 and the second axis AX2 of the third fluid passage FD3 are moreover disposed so as to be mutually coaxial, the first and the second position of the blocking element ASP can be implemented by a simple linear upward and downward movement of the blocking element ASP. Moreover, the coupling element KE is disposed so as to be coaxial with the first and the second axis AX1, AX2, or the coupling element KE in the direction of longitudinal extent extends along an axis which is disposed so as to be coaxial with the first and the second axis AX1, AX2, respectively, such that a force of the coupling element KE acts centrically on the blocking element ASP. This leads to particularly uniform sealing along a circumference of the first and the third fluid passage FD1, FD3, respectively.

In order to be able to reliably seal the first fluid passage FD1 as well as the third fluid passage FD3, the blocking element ASP is furthermore configured as a double-sided elastic seal element such that an upper side of the blocking element ASP can reliably seal the third fluid passage FD3, and a lower side of the blocking element ASP can reliably seal the first fluid passage FD1. Furthermore, a leaf spring BF of meandering shape is disposed about the blocking element ASP, said leaf spring BF pushing the blocking element ASP toward the cover element AE such that the coupling element KE has to exert only a compressive force but not a tensile force on the blocking element ASP.

Since switching and/or flow noises which under certain circumstances can be perceived to be annoying can be created when switching the blocking element ASP between the first position and the second position, the pneumatic valve PV additionally comprises a sound absorption element SE which is disposed on the cover element AE. The sound absorption element SE is composed of a sound-absorbent material such as a foam or a felt, and is soft on the one hand and fluid-permeable on the other hand, such that a generation of noise when switching the blocking element ASP can be substantially damped. The sound absorption element SE defines a central passage D through which the coupling element KE extends. This permits particularly efficient noise damping.

Figure 3:
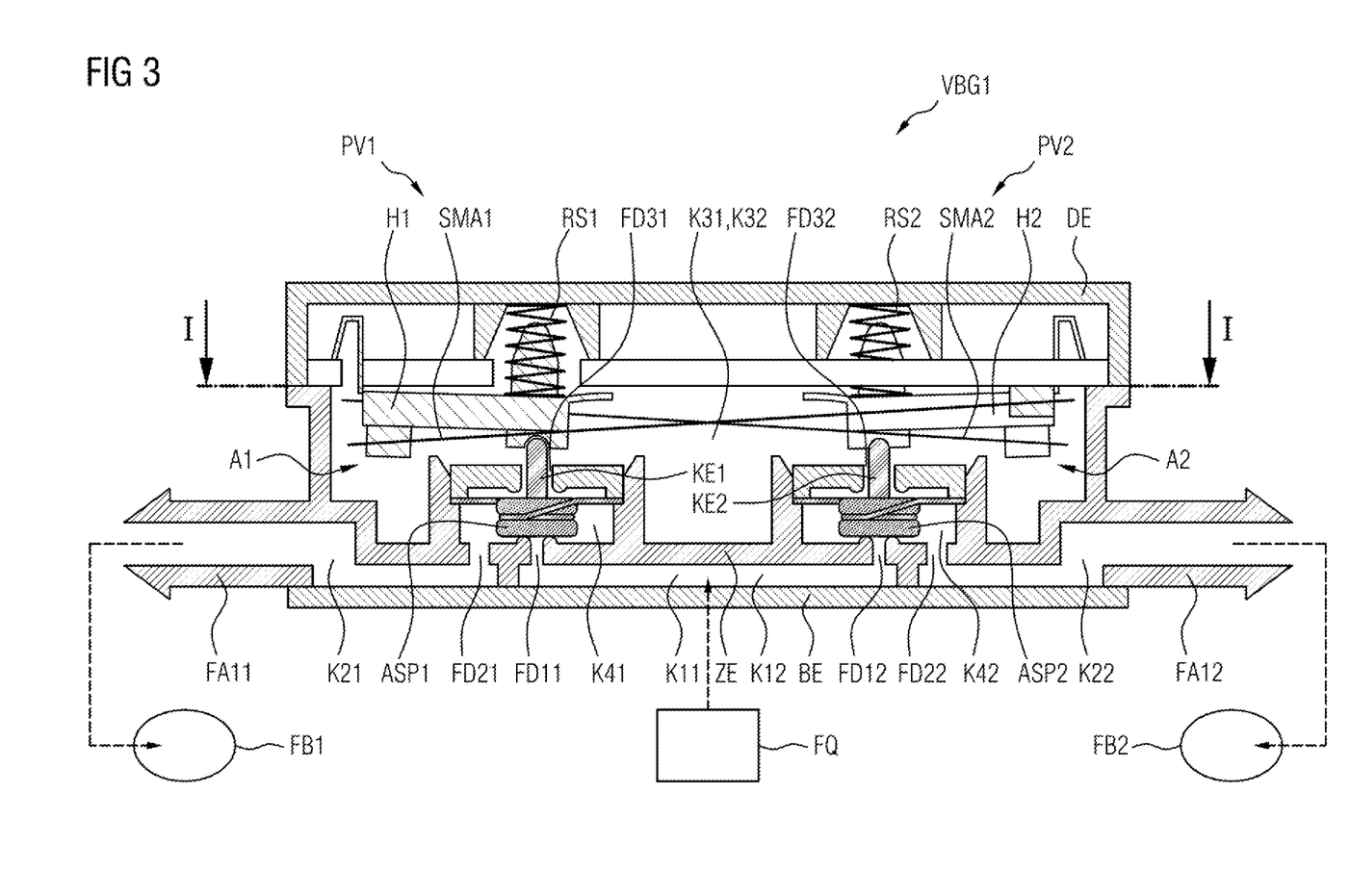
FIG. 3 shows a schematic view of an exemplary valve assembly according to the disclosure.

Reference is now to be made to FIG. 3 which shows a schematic view of a first valve assembly VBG1. The first valve assembly VBG1 is constructed from a first pneumatic valve PV1 and a second pneumatic valve PV2. The first pneumatic valve PV1 and the second pneumatic valve PV2 herein are in principle of identical construction to the pneumatic valve PV which has already been described in the context of FIGS. 1 and 2.

The first pneumatic valve PV1 comprises a first actuator unit A1 which comprises a first blocking element ASP1, a first coupling element KE1, a first lever element 111, a first actuator element, and a first restoring element RS1. The second pneumatic valve PV2 comprises a second actuator unit A2 which comprises a second blocking element ASP2, a second coupling element KE2, a second lever element 112, a second actuator element, and a second restoring element RS2. For reasons of improved clarity, the sound absorption element SE is not illustrated in the case of the pneumatic valves PV1, PV2.

The first actuator element and the second actuator element in the specific example of FIG. 3 are again configured as shape memory alloy elements SMA1, SMA2. Of course, the first and the second actuator elements can also be other actuator elements such as piezoelectric or magnetic actuator elements.

The first valve assembly VBG1 is configured for filling and/or emptying two separated or separate fluid bladders FB1, FB2, respectively. To this end, the first valve chamber K11 of the first pneumatic valve PV1 is fluidically connected to the first valve chamber K12 of the second pneumatic valve PV2. The first valve chamber K11 of the first pneumatic valve PV1 and the first valve chamber K12 of the second pneumatic valve PV2 are in each case connected to the fluid source FQ. In the specific example of FIG. 3, the first valve chambers K11, K12 are configured as a common valve chamber which is formed by the basic element BE and the base element ZE. Furthermore, the second valve chamber K21 of the first pneumatic valve PV1 is fluidically connected to the first fluid bladder FB1 via a first fluid connector FA11, and the second valve chamber K22 of the second pneumatic valve PV2 is fluidically connected to the second fluid bladder FB2 via a second fluid connector FA12. The third valve chamber K31 of the first pneumatic valve PV1 and the third valve chamber K32 of the second pneumatic valve PV2 are in each case connected to the environment. In the specific example of FIG. 3, the third valve chambers K31, K32 are configured by a common valve chamber which is formed by the base element ZE and the cover element DE.

The first blocking element ASP1 in the first valve assembly VBG1 is movable between a first position and a second position such that either the first valve chamber K11 can be fluidically connected to the second valve chamber K21, or the second valve chamber K21 can be fluidically connected to the third valve chamber K31. Likewise, the second blocking element ASP2 in the first valve assembly VBG1 is movable between a first position and a second position such that either the first valve chamber K12 can be fluidically connected to the second valve chamber K22, or the second valve chamber K22 can be fluidically connected to the third valve chamber K32.

For improved clarity, the first blocking element ASP1 and the second blocking element ASP2 in FIG. 3 are in each case shown in the second position. Of course, the first blocking element ASP1 and the second blocking element ASP2 can in each case assume either the first position or the second position in a mutually independent manner. For example, when the second blocking element ASP2 is in the second position as shown in FIG. 3 and the first blocking element ASP1 is in the first position, the first fluid bladder FB1 can thus be supplied with a fluid provided by the fluid source FQ while the second fluid bladder FB2 is ventilated.

Depending on the position of the first blocking element ASP1 or of the second blocking element ASP2, respectively, it is thus possible for the first and the second fluid bladder FB1, FB2 to be filled and/or emptied in a mutually separate manner via the first valve assembly VBG1. A 3/2-way valve via which two fluid bladders can be filled and/or emptied in a mutually separate manner is thus achieved in a simple manner.

Of course, it is possible for more than two fluid bladders to be filled or to be emptied in a mutually separate manner. To this end, further pneumatic valves have only to be conjointly switched in a corresponding manner with the first pneumatic valve PV1 and the second pneumatic valve PV2.

Figure 4:
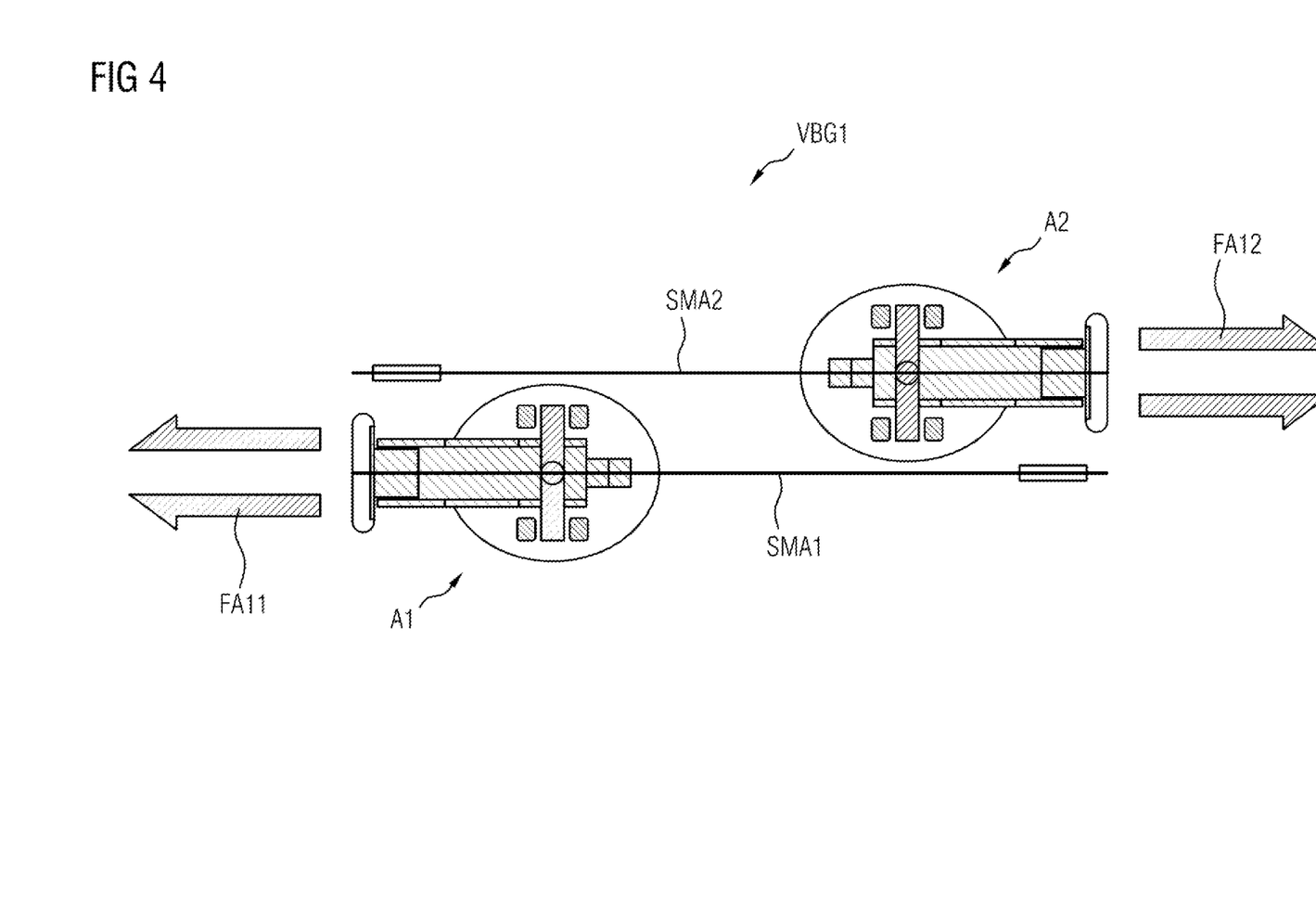
FIG. 4 shows a schematic sectional view of the exemplary valve assembly along the line I-I of FIG. 3.

Reference is now to be made to FIG. 4 which shows a schematic sectional view of the first valve assembly VBG1 along the line I-I of FIG. 3.

As can be seen in FIG. 4, the valve connectors FA11, FA12 and the actuator units A1, A2 are disposed so as to be mutually offset such that the first valve assembly VBG1 is configured so as to be as space-saving as possible.

Figure 5:
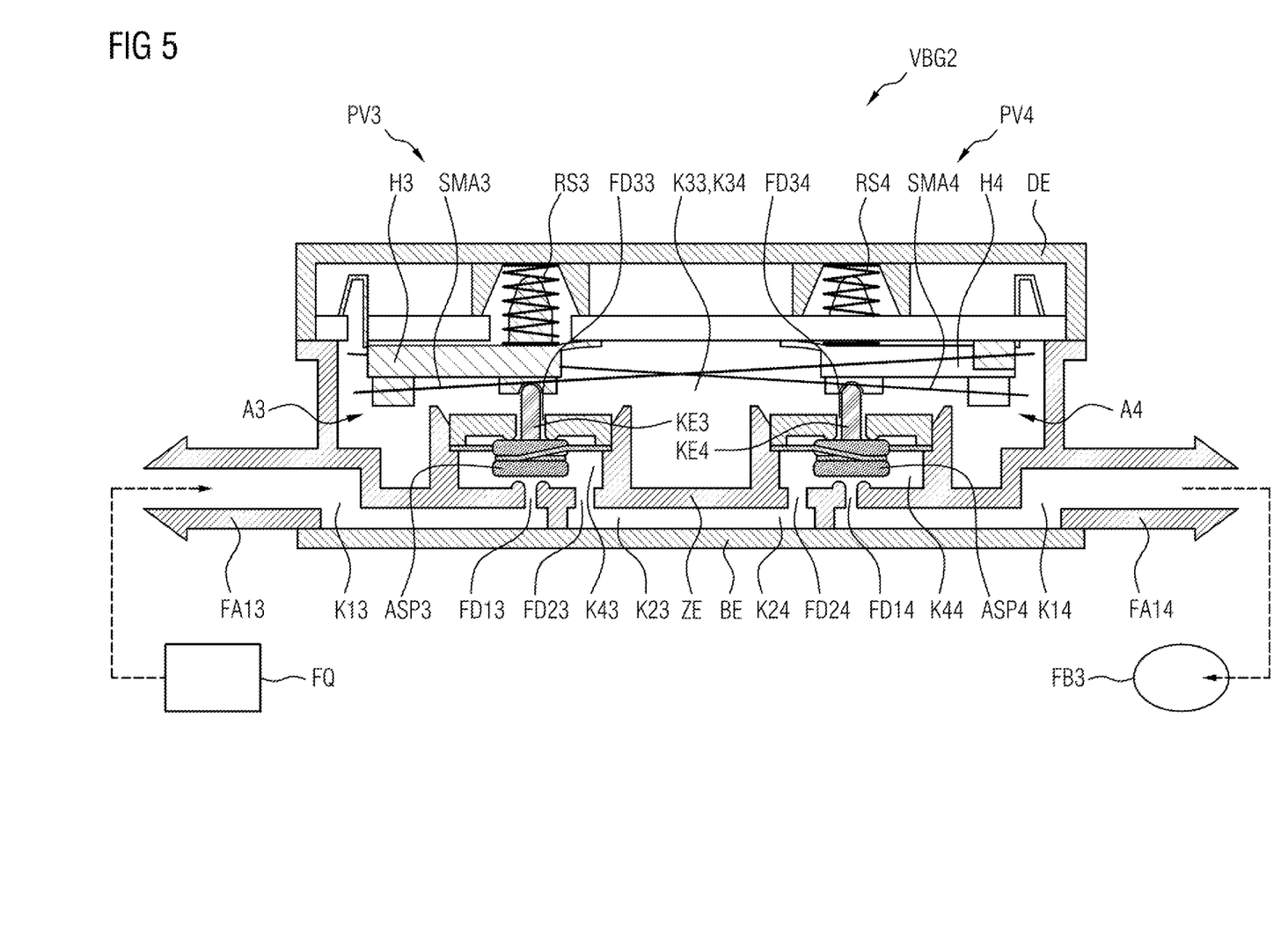

Reference is now to be made to FIG. 5 which shows a schematic view of a second valve assembly VBG2. The second valve assembly VBG2 is constructed from a first pneumatic valve PV3 and a second pneumatic valve PV4. The first pneumatic valve PV3 and the second pneumatic valve PV4 herein are of a fundamentally identical construction as the pneumatic valve PV which has already been described in the context of FIGS. 1 and 2; however, the first valve chamber of the second pneumatic valve PV4 here is conjointly switched in a somewhat different manner, as will be explained in more detail later.

The first pneumatic valve PV3 again comprises a first actuator unit A3 which comprises a first blocking element ASP3, a first coupling element KE3, a first lever element 113, a first actuator element, and a first restoring element RS3. The second pneumatic valve PV4 comprises a second actuator unit A4 which comprises a second blocking element ASP4, a second coupling element KE4, a second lever element 114, a second actuator element, and a second restoring element RS4. For reasons of improved clarity, the sound absorption element SE is not illustrated in the case of the pneumatic valves PV3, PV4.

The first actuator element and the second actuator element in the specific example of FIG. 5 are again configured as shape memory alloy elements SMA3, SMA4. Of course, the first and the second actuator elements can also be other actuator elements such as piezoelectric or magnetic actuator elements.

Figure 6:
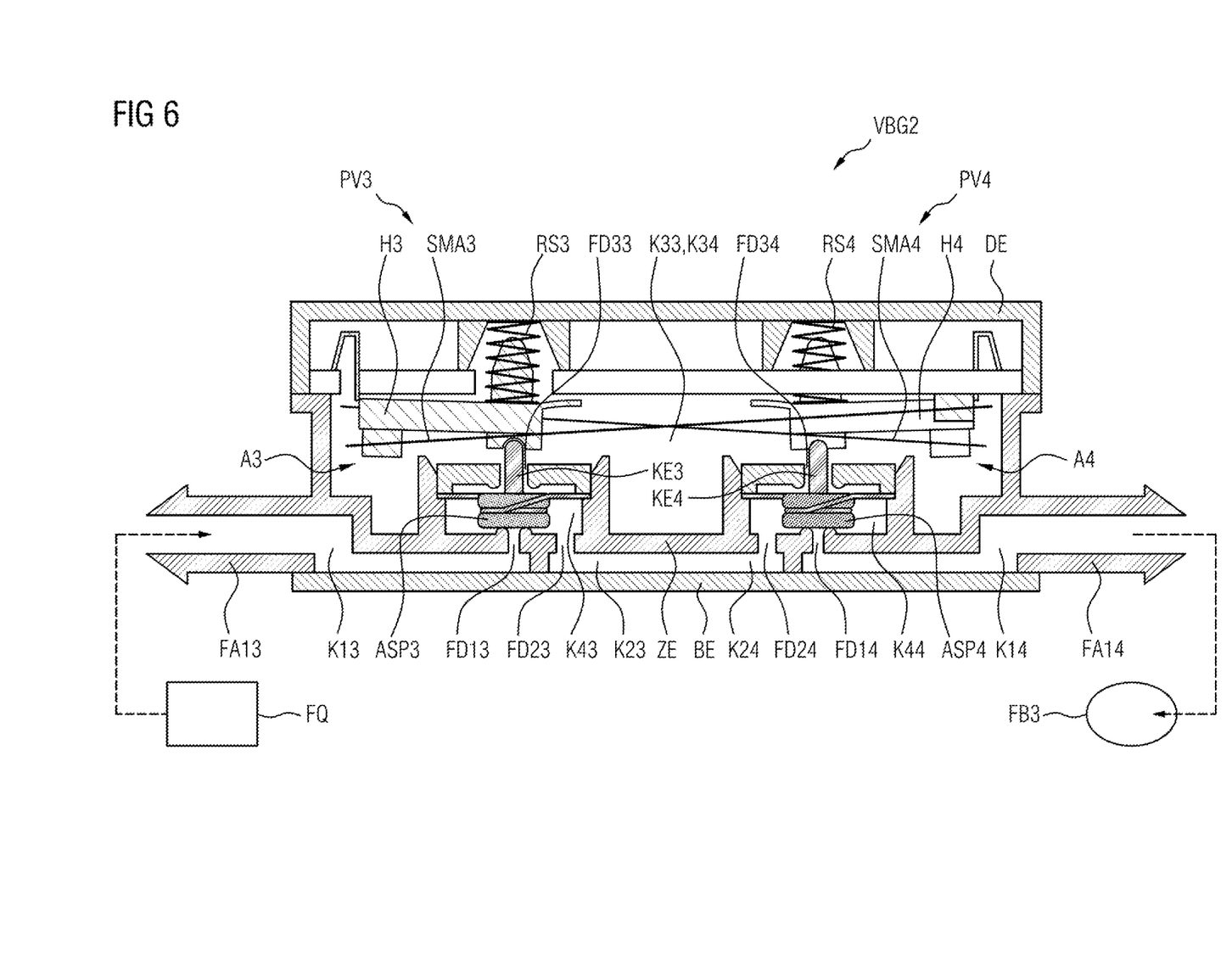
Figure 7:
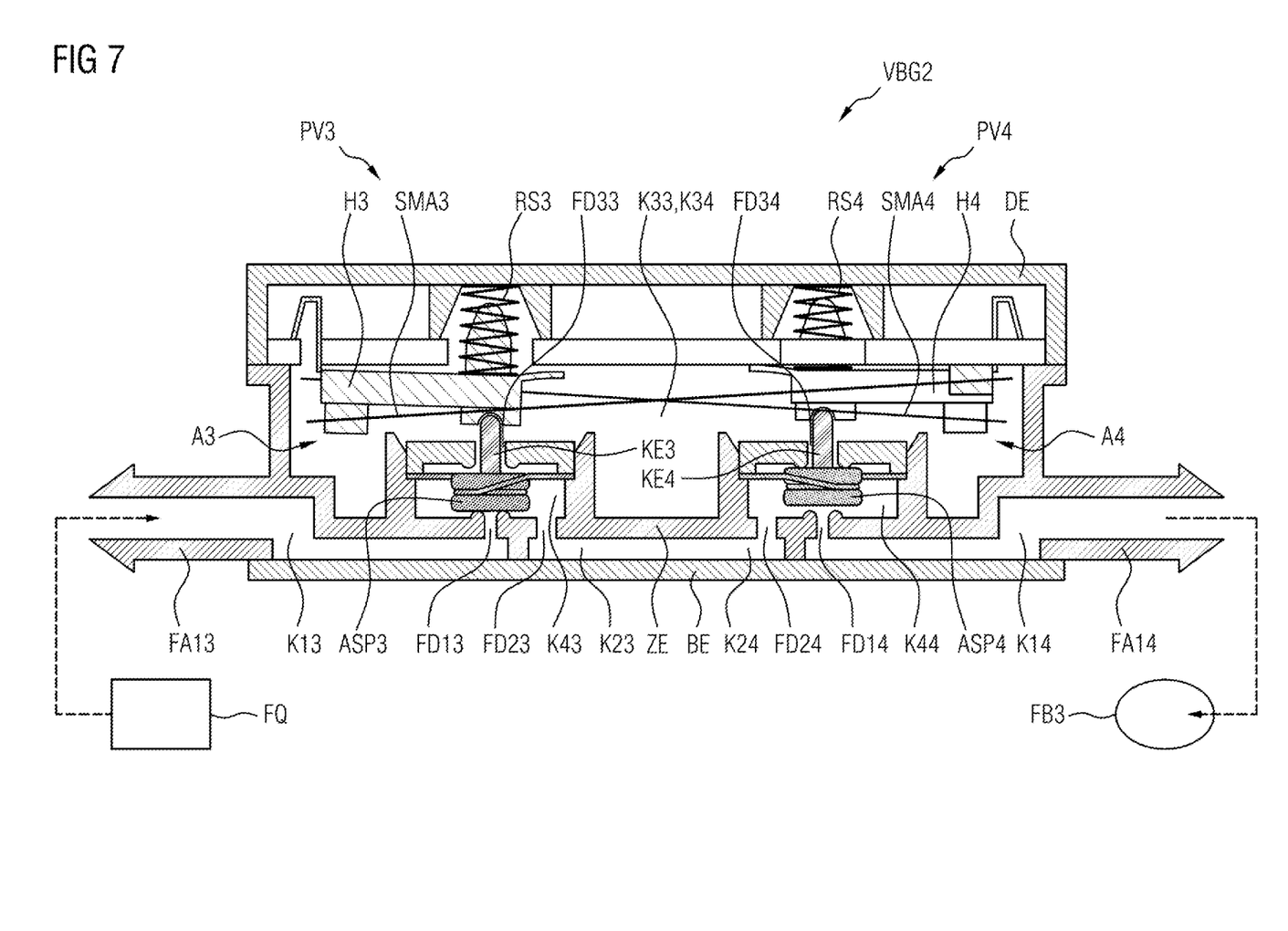

The second valve assembly VBG2 is configured as a 3/3-way valve for filling and/or emptying a single fluid bladder FB3 or for maintaining the pressure in the latter. To this end, the second valve assembly VBG2 has three switched positions which are shown in FIGS. 5 to 7. The first switched position by which the fluid bladder FB3 can be filled is shown in FIG. 5. The second switched position by which the pressure in the fluid bladder FB3 can be maintained is shown in FIG. 6. The third switched position by which the fluid bladder FB3 can be emptied is shown in FIG. 7.

As can be seen in FIG. 5, in the second valve assembly VBG2 the second valve chamber K23 of the first pneumatic valve PV3 is fluidically connected to the second valve chamber K24 of the second pneumatic valve PV4. The second valve chambers K23, K24 herein are configured as a common valve chamber which again is formed by the basic element BE and the base element ZE. Furthermore, the first valve chamber K13 of the first pneumatic valve PV3 is fluidically connected to the fluid source FQ via a first fluid connector FA13, and the first valve chamber K14 of the second pneumatic valve PV4 is fluidically connected to the fluid bladder FB3 via a second fluid connector FA14. In the case of the second pneumatic valve PV4, the first valve chamber K14 is thus not connected to a fluid source (as in the case of the first valve assembly VBG1, cf. FIG. 3) but to the fluid bladder FB3. The third valve chamber K33 of the first pneumatic valve PV3 and the third valve chamber K34 of the second pneumatic valve PV4 are again in each case connected to the environment. In the specific example of FIG. 5, the third valve chambers K33, K34 are again configured as a common valve chamber which is formed by the base element ZE and the cover element DE.

As in the first valve assembly VBG1, the first blocking element ASP3 in the second valve assembly VBG2 is also movable between a first position and a second position such that either the first valve chamber K13 can be fluidically connected to the second valve chamber K23, or the second valve chamber K23 can be fluidically connected to the third valve chamber K33. Likewise, the second blocking element ASP4 in the second valve assembly VBG2 is movable between a first position and a second position such that either the first valve chamber K14 can be fluidically connected to the second valve chamber K24, or the second valve chamber K24 can be fluidically connected to the third valve chamber K34.

When the fluid bladder FB3 is now to be filled, the first shape memory alloy element SMA3 and the second shape memory alloy element SMA4 are in each case impinged with electric energy such that the first blocking element ASP3 as well as the second blocking element ASP4 move to the second position. On account thereof, a fluidic connection is established between the fluid source FQ, the first valve chamber K13, the two second valve chambers K23, K24, and the first valve chamber K14. On account thereof, fluid from the fluid source FQ can flow into the fluid bladder FB3, and the fluid bladder FB3 can be filled.

When the pressure in the fluid bladder FB3 is now to be maintained (cf. FIG. 6), an impingement of the first and of the second shape memory alloy element SMA3, SMA4 with energy is thus terminated. The first and the second blocking element ASP3, ASP4 by virtue of the restoring forces of the first and the second restoring elements RS3, RS4 move to the second position. On account thereof, a fluidic connection between the fluid source FQ and the second valve chamber K23 of the pneumatic valve PV3 is interrupted. Likewise, a fluidic connection between the fluid bladder FB3 and the second valve chamber K24 of the second pneumatic valve PV4 is interrupted. Fluid can thus neither flow from the fluid source FQ into the fluid bladder FB3, nor can fluid flow from the fluid bladder FB3 into the environment. The pressure in the fluid bladder FB3 is thus maintained. Moreover, no fluid can flow from the fluid source FQ to the fluid bladder FB3 even in the event of a leakage of the presently sealed fluid passages FD13 and/or FD14, since the fluid would be discharged via the fourth valve chambers K43 and K44, respectively, which are connected to the environment. Unintentional filling of the fluid bladder FB3 is thus reliably avoided in the pressure-maintaining state without any impingement of the first and of the second shape memory alloy element SMA3, SMA4 with energy.

When the fluid bladder FB3 now is to be emptied or ventilated, respectively, (cf. FIG. 7), only the second shape memory alloy element SMA4 is impinged with electric energy. On account thereof, the second blocking element ASP4 again moves to the first position such that there is a fluidic connection between the fluid bladder FB3, the first valve chamber K14, and the second valve chambers K23, K24. Since the first blocking element ASP3 is furthermore in the second position, there is a fluidic connection between the second valve chambers K23, K24 and the third valve chamber K33 (and also K34, respectively). On account thereof, there is in turn a fluidic connection between the fluid bladder FB3 and the environment such that fluid present in the fluid bladder FB3 can flow from the fluid bladder FB3 into the environment, and the fluid bladder FB3 can be ventilated or emptied.

Of course, in order to save installation space, the actuator units A3, A4 can be disposed so as to be mutually offset, in a manner similar to the first valve assembly VBG1 (cf. FIG. 4).

The second valve assembly VBG2 represents a 3-3-way NC valve for filling and/or emptying a fluid bladder FB3 and for maintaining pressure in the latter, wherein it is not necessary for the actuator elements to be disposed in a fluid-tight manner in the valve. The second valve assembly VBG2 enables in particular the implementation of a massage function without the risk of unintentionally filling the fluid bladder FB3.

While the activation of the blocking element in the context of FIGS. 1 and 7 has been described in such a manner that the blocking element when terminating the impingement with electric energy is in the second position, it is of course also possible for the operating mode of the actuator unit to be varied such that the blocking element when terminating the impingement with electric energy is in the first position. On account thereof, an NC valve or an NO valve can be achieved, depending on the specific application.

The invention claimed is:

1. A pneumatic valve for a fluid bladder of a pneumatic seat adjustment device of a vehicle seat, comprising:
    a first valve chamber configured to connect to a fluid source;
    a second valve chamber separate from the first valve chamber and configured to connect to the fluid bladder, the fluid bladder separate from the first valve chamber and the second valve chamber and configured to connect to an environment of the pneumatic valve;
    a fourth valve chamber separate from the first valve chamber, the second valve chamber and a third valve chamber, and fluidically connected to the first valve chamber via a first fluid passage, fluidically connected to the second valve chamber via a second fluid passage, and fluidically connected to the third valve chamber via a third fluid passage; and
    an actuator unit comprising a blocking element disposed in the fourth valve chamber and an actuator element disposed in the third valve chamber, wherein the actuator element is coupled to the blocking element and is configured to move the blocking element between a first position wherein the first fluid passage is opened and the third fluid passage is closed, and a second position wherein the first fluid passage is closed and the third fluid passage is opened.

2. The pneumatic valve as claimed in claim 1, wherein the actuator element comprises a shape memory alloy element configured to activate the blocking element when impinged with electric energy.

3. The pneumatic valve as claimed in claim 1, wherein the actuator unit further comprises a coupling element extending through the third fluid passage and coupling the blocking element to the actuator element.

4. The pneumatic valve as claimed in claim 3, further comprising a sound absorption element disposed in the third valve chamber and configured to dampen flow noises.

5. The pneumatic valve as claimed in claim 4, wherein the sound absorption element defines a passage and the coupling element extends through the passage.

6. The pneumatic valve as claimed in claim 3, wherein the actuator unit further comprises a lever element disposed in the third valve chamber and movably connected to a housing of the pneumatic valve via a linking region, wherein a first fastening portion of the lever element is connected to the actuator element and a second fastening portion of the lever element is connected to the coupling element in-so that when activating the actuator element a movement of the lever element is converted to a movement of the coupling element.

7. The pneumatic valve as claimed in claim 6, wherein the actuator element is fastened to the first fastening portion so that a first lever arm is formed between the first fastening portion and the linking region, and the coupling element is fastened to the second fastening portion so that a second lever arm larger than the first lever arm is formed between the second fastening portion and the linking region.

8. The pneumatic valve as claimed in claim 6, wherein the actuator unit further comprises a restoring element connected to the housing and the lever element and configured to pretension the blocking element to the first position or to the second position without activating the actuator element.

9. The pneumatic valve as claimed in claim 1, wherein the first fluid passage is disposed on a first side of the fourth valve chamber, and the third fluid passage is disposed on a second side, opposite the first side, of the fourth valve chamber, and the blocking element is movable between the first and the second side.

10. The pneumatic valve as claimed in claim 9, wherein the first fluid passage extends along a first axis, and the third fluid passage extends along a second axis, and the first axis and the second axis are mutually coaxial.

11. The pneumatic valve as claimed in claim 9, wherein the second fluid passage is disposed on the first side of the fourth valve chamber and has a predetermined spacing from the first fluid passage.

12. The pneumatic valve as claimed in claim 11, wherein the fourth valve chamber is defined by a first component, the first component defining the first fluid passage and the second fluid passage, and by a second component which is connected to the first component and defines the third fluid passage.

13. A valve assembly for two fluid bladders of an adjustment device of a vehicle seat, comprising:
a first pneumatic valve as claimed in claim 1, configured to at least one of fill and empty a first fluid bladder; and
a second pneumatic valve as claimed in claim 1, configured to at least one of fill and empty a second fluid bladder,
wherein:
the first valve chamber of the first pneumatic valve is fluidically connected to the first valve chamber of the second pneumatic valve;
at least one of the first valve chamber of the first pneumatic valve and the first valve chamber of the second pneumatic valve is configured to fluidically connect to the fluid source;
the second valve chamber of the first pneumatic valve is configured to connect to the first fluid bladder;
the second valve chamber of the second pneumatic valve is configured to connect to the second fluid bladder; and
the third valve chamber of the first pneumatic valve and the third valve chamber of the second pneumatic valve are configured to connect to the environment.

14. A valve assembly for a fluid bladder of an adjustment device of a vehicle seat, comprising:
a first pneumatic valve as claimed in claim 1; and
a second pneumatic valve as claimed in claim 1,
wherein:
the second valve chamber of the first pneumatic valve is fluidically connected to the second valve chamber of the second pneumatic valve;
the first valve chamber of the first pneumatic valve is configured to connect to the fluid source;
the first valve chamber of the second pneumatic valve is configured to connect to the fluid bladder; and
the third valve chamber of the first pneumatic valve and the third valve chamber of the second pneumatic valve are configured to connect to the environment.

15. An adjustment device for adjusting a contour of a seat bearing surface of a vehicle seat, comprising:
a fluid bladder for adjusting the contour of the seat bearing surface; and
a pneumatic valve as claimed in claim 1, the second valve chamber of said pneumatic valve fluidically connected to the fluid bladder.

* * * * *